4 Sheets—Sheet 1.

W. H. BROCK.
Machine for Filling Cans, &c., with Liquids.

No. 204,477. Patented June 4, 1878.

Witnesses.

Inventor.

W. H. BROCK.
Machine for Filling Cans, &c., with Liquids.

No. 204,477. Patented June 4, 1878.

Witnesses.

Inventor.
William H. Brock
Per Alexander H. Boyer
Atty.

W. H. BROCK.
Machine for Filling Cans, &c., with Liquids.

No. 204,477. Patented June 4, 1878.

Witnesses.

Inventor.

UNITED STATES PATENT OFFICE.

WILLIAM H. BROCK, OF BROOKLYN, NEW YORK.

IMPROVEMENT IN MACHINES FOR FILLING CANS, &c., WITH LIQUIDS.

Specification forming part of Letters Patent No. 204,477, dated June 4, 1878; application filed May 2, 1878.

*To all whom it may concern:*

Be it known that I, WILLIAM H. BROCK, of the city of Brooklyn, in the county of Kings and State of New York, have invented new and useful Improvements in Machines for Filling Cans, Barrels, or other Vessels with Liquids, of which the following specification and accompanying drawings furnish a full description and exhibit.

The object of my invention is, by novel combinations, automatically to divide any given quantity or weight of liquid into equally proportional parts corresponding to the desired number of cans, barrels, or other vessels to be filled, and for filling said cans or vessels simultaneously and in equal quantities, and likewise to provide a method for placing the vessels to be filled and for their ready removal after filling.

Figure 1:
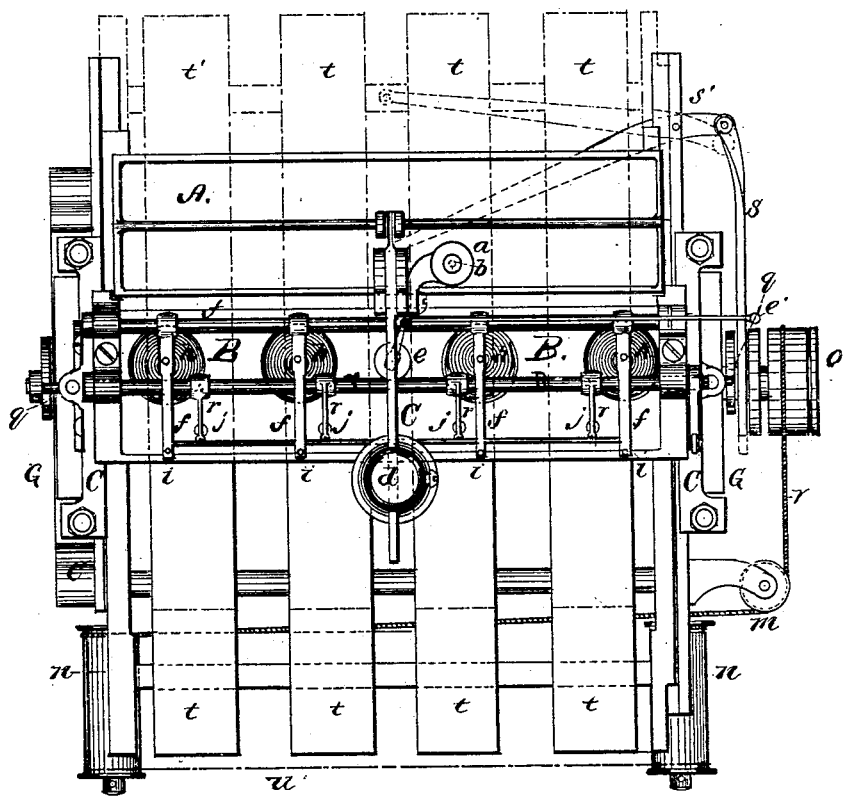
Figure 2:
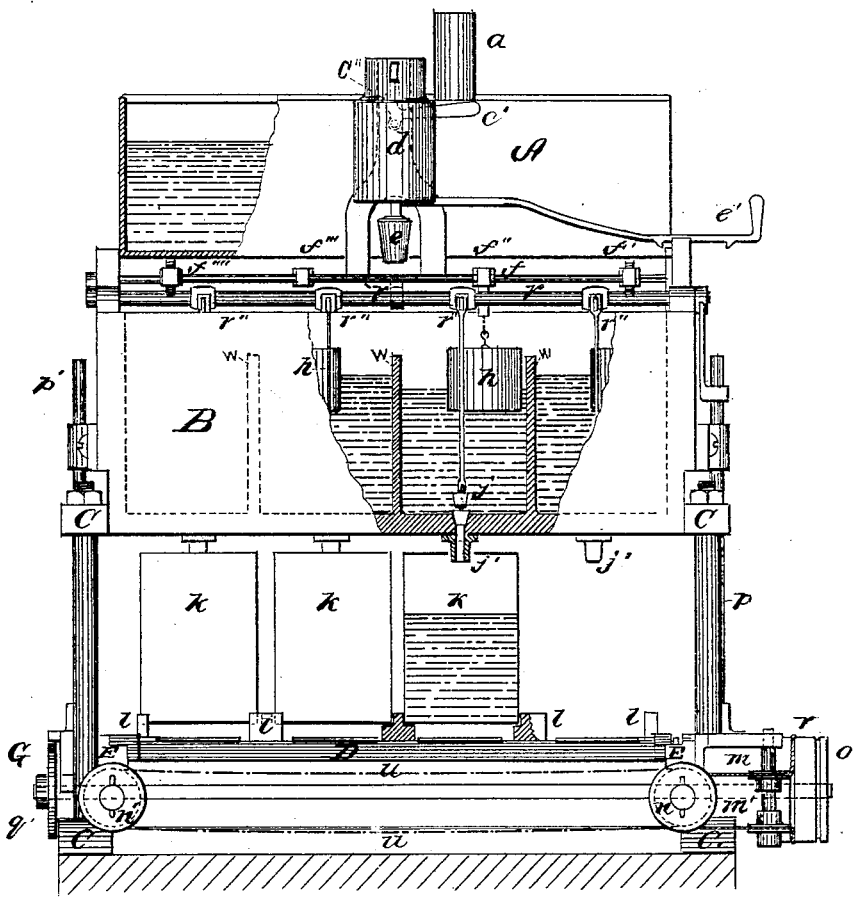
Figure 3:
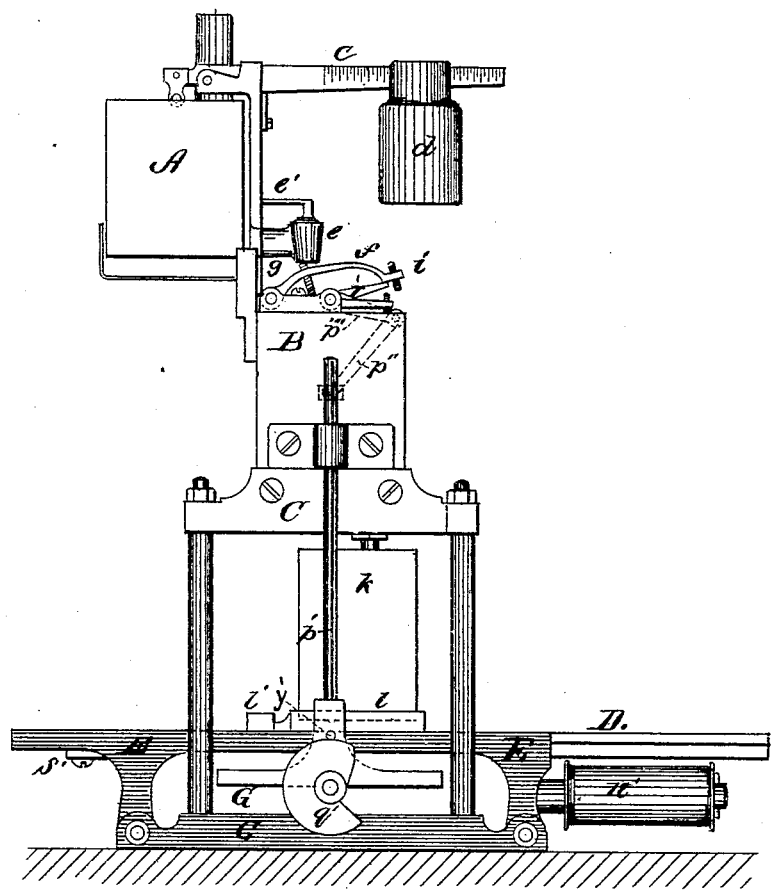
Figure 4:
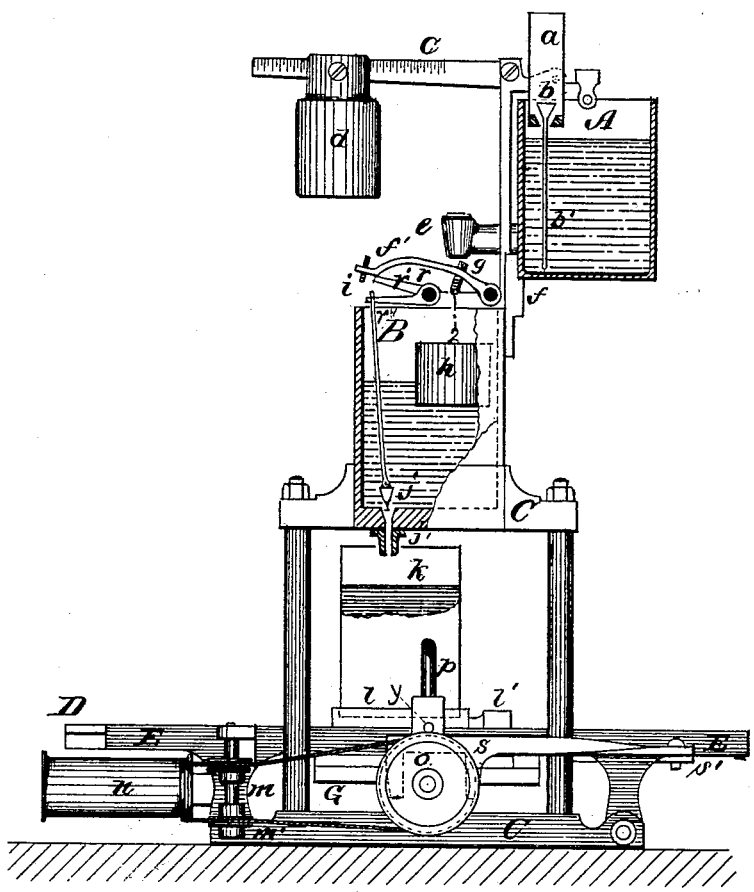

Figure 1 of the accompanying drawings represents this invention in plan or top view. Figs. 2 and 4 show vertical, sectional, front, and side views of the interior parts; and Fig. 3 represents a side elevation while the vessels are filling.

The liquid which is to be divided and equally distributed in the cans is first admitted by the tube $a$ through the valve $b$ into the tank $A$, which is suspended to one end of the lever $c$. To the other end of the lever is hung the weight $d$, which is moved along to a point which the graduated scale indicates as the desired weight of liquid to be subdivided. As the tank fills and the weight rises, the lever, releasing its pressure on the rest $c'$, allows it to fall until its progress is arrested by its catch $c''$, at which point the liquid in the tank and the weight are in equilibrium. The valve is closed and is prevented from opening to the further intropassage of the liquid by contact of the lever with the catch.

By this device, with the weight once set so as to measure the desired quantity of liquid, after discharging the contents of the tank A into the tank B by opening the valve $e$ and readjusting the rest $c'$ to the lever, the valve $b$ again opens, and the operation is automatically repeated.

The tank B, which is firmly secured to the substructure C of the machine, is divided by the partitions $w$, which are of equal height, into compartments of like size, and in number more or less, according to the capacity of the machine, in which are hung suspended to the supporting-frame $f$, or its equivalent, the displacement-weight $h$, of the same size and density. The tank is likewise provided with the lifting-frame $r$, attached to which, as shown in the accompanying drawings, is the lever $r'$, for raising the displacement-weights and the levers $r''$, whereby the valves $j$ are opened and closed.

For the purpose of ascertaining the final and permanent adjustment of the displacement-weights and their supporting-frame, whereby, when the machine is put into operation, the given weight or quantity of liquid in the tank shall be invariably and automatically divided into equal parts, corresponding to the number of cans or other vessels to be filled, a preliminary test is made, as follows: The displacement-weights are first adjusted by the screws $g$ so as to hang suspended the same, or nearly the same, distance from their supporting-frame. The supporting-frame is at the same time raised and temporarily set by turning down the screws $i$ at such an angle of elevation that, when equal quantities of the liquid into which the whole given amount has previously been accurately divided, are put into the several cells of the tank, each of the cells shall be filled thereby to the top of the partitions. Should any of the compartments or cells be found upon this trial to have a greater capacity than the others, whereby the liquid therein does not reach the requisite height, the displacement-weights of such are lowered accordingly farther into the liquid until the same rises to the common level of the top of the partitions. The supporting-frame is then gradually lowered by turning up the screws $i$ until the descending displacement-weights cause the liquid in their respective cells to rise so as to barely overflow or wash the top of the partitions.

The requisite position and adjustment of the displacement-weights and the supporting-frame having thus been determined and permanently fixed, the machine is ready for practical use. It is evident that both the height of the partitions and the size of the displacement-weights are dependent upon the intended capacity of the machine. When steam or other convenient motive power is applied by means of the pulley O, the lugs or followers $y\ y'$, as shown in Figs. 3 and 4, coming into contact with the intermittent cams $q\ q'$, raise the elevator G, and, by means of its shafts $p\ p'$ and levers $p''$ and $p'''$, motion is at the same time communicated to the supporting and lifting frames $f$ and $r$, whereby, the displacement-weights being suddenly lifted, the liquid in the tank instantaneously falls below the top of the partitions into the spaces created by the elevation of the weights, and thus equally divided is held in the respective cells. Exactly coincident with the lifting of the weights and the division of the liquid is the opening of the valves $j$ for the outlet of the liquid into the several cans, which are likewise at the same time automatically placed in position for filling under the spouts $j'$, as hereinafter shown.

The spouts $j'$, by which the liquid is conducted into the cans, and which are inserted within the aperture of the cans at the time of filling to prevent waste, are made with a beveled edge, whereby the space thus saved in cases of vessels of small apertures may be utilized by providing the machine with spouts of correspondingly-increased caliber when rapid delivery is desired.

The carriage D is moved forward and backward along its bed E by its combinations with the rods or levers $s$ and $s'$, the latter of which is connected with the carriage-frame at the rear, as shown in Fig. 1, while the former, by means of its arms, which extend downward on each side of the propelling-shaft, as shown in Fig. 4, is brought into contact with a lug projecting from a disk of the said shaft, whereby the desired movement is secured to the carriages.

The cans to be filled are first placed on the slats $t$ and between the guides $l'$, when the carriage is extended to the rear. After the falling of the elevator G, by the release of the cams $q\ q'$ from their followers $y\ y'$, the forward movement of the carriage brings the cans under the spouts $j'$ for filling. As soon as thus brought into position, the lifters $l$ of the elevator raise the cans so that the beveled spouts enter the aperture of the cans sufficiently to prevent overflow and consequent waste of liquid. Simultaneously with the raising of the cans to be filled occurs the equal division of liquid in the tank B by the displacers $h$ and the opening of the valves $j$ for the outlet of the liquid, as hereinbefore described. While the cans are filling the carriage again moves backward into position for the second tier of cans to be placed between the guides $l'$, as before. As soon as the first tier of cans is filled, the tank B is thereby emptied, the valves $j$ are closed, the displacement-weights resume their normal position, and the contents of the tank A, which has been filling while the tank B was discharging, is emitted through the open valve $e$ into the tank B in readiness for filling the next series of cans. The filled cans are in the meantime, by the falling of the elevator G, deposited upon the carriage, which, moving forward, carries them out to the front of the carriage into a position convenient for soldering, while by the same movement the second tier is placed under the spouts, ready to be filled.

While the apertures of the first tier of cans or other vessels are being closed and the second tier is filling, a third tier is placed within the guides at the opportune time, as before. When the second tier of cans is filled, the same sequential forward movement of the carriage carries them out, and also locates the third tier for filling, as before. When the carriage again moves backward, the vessels of the first, being ready for removal, are forced off by the second tier, which assumes their position, and are deposited on the carrier $u$, to which motion is communicated by the belt $v$ or its equivalent, which passes from the driving-pulley O over the idlers $m\ m'$, around the drums $n\ n'$, whose pivotal shafts are securely fastened to the carriage-bed E, as shown by Fig. 4.

It is evident the carrier $u$ may be extended to any necessary or convenient distance beyond the machine with the same combinations and like results as herein explained.

What I claim as my invention is—

1. The combination, with a tank, A, of the tube $a$, the valve $b$, the lever $c$, with its graduated scale and weight $d$, and of the rest $c'$ with the catch $c''$, for automatically weighing a body of liquid, substantially as and for the purposes herein set forth.

2. The combination, with a tank, B, divided into equal compartments by its partitions $w$, of the displacement-weights $h$, the supporting-frame $f$, the adjusting-screws $g$ and $i$, the lifting-frame $r$, with its levers $r'$ and $r''$, the substructure C, the beveled spouts $j'$, the driving-pulley and shaft O, the cams $q\ q'$ and followers $y\ y'$, the rods $p\ p'$ with the connecting-levers $p''$ and $p'''$, for dividing a given weight of liquid automatically into the desired number of equal parts, substantially as and for the purposes as herein set forth.

3. The combination, with the carriage-frame D of the carriage-bed E, of the cans or other receiving-vessels K, of the levers $s$ and $s'$, and driving-power O by means of the lever-arms and lug, all constructed and arranged substantially as specified.

4. The combination, with the elevator-frame G, of the supports $l$, the guides $l'$, the cans or their equivalent $k$, the substructure C, the lifting-rods $p\ p'$, the cams $q\ q'$ and followers $y\ y'$, and the driving-power O, substantially as herein shown and described.

5. The combination, with the carrier $u$, of the drums $n\ n'$ and axles, the carriage-bed E, the cans *k* or their equivalent, the belt *v*, the idlers *m m'* and their pivotal shaft, and driving-pulley O, substantially as and for the purposes herein set forth.

6. The combination, with the driving-power O, of the carriage-frame D, its bed E, the levers *s* and *s'*, with the propelling-arms and lug, the cans *k* or other equivalent receiving-vessels, the carrier *u*, with its drums *n n'* and axles, the idlers *m m'*, and belt *v*, for placing the vessels to be filled and removing them after filling, substantially as herein shown and described.

7. The combination, with a liquid-filling machine made as here shown and described, of the receiving-vessels *k*, driving-power O, tank A, with its tube *a*, valve *b*, lever *c*, weight *d*, rest *c'*, and catch *c''*, for the automatic weighing, division, and distribution of the liquid, substantially as and for the purpose herein set forth.

WILLIAM H. BROCK.

Witnesses:
ALEXANDER H. WRIGHT,
WM. H. BOWRON.